Feb. 22, 1955　　　V. P. SWARTZLANDER　　　2,702,518
WARNING ATTACHMENT FOR SPEEDOMETERS
Filed March 17, 1953　　　　　　　　　　　　2 Sheets-Sheet 1

Virgil P. Swartzlander
INVENTOR.

BY *Clarence A. O'Brien*
*and Harvey B. Jackson*
Attorneys

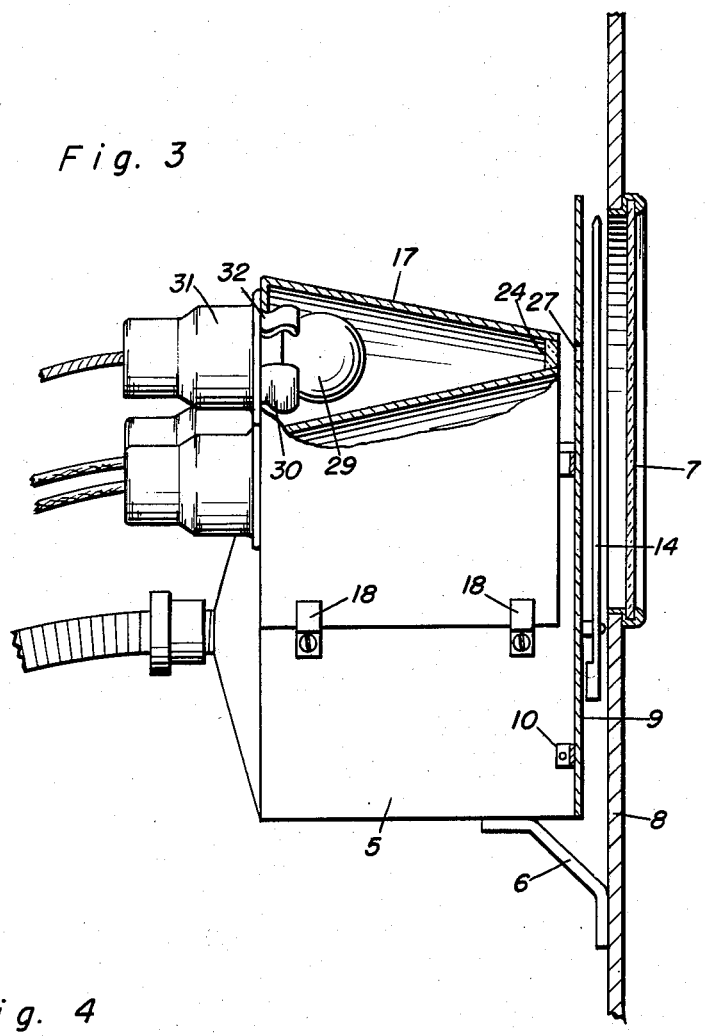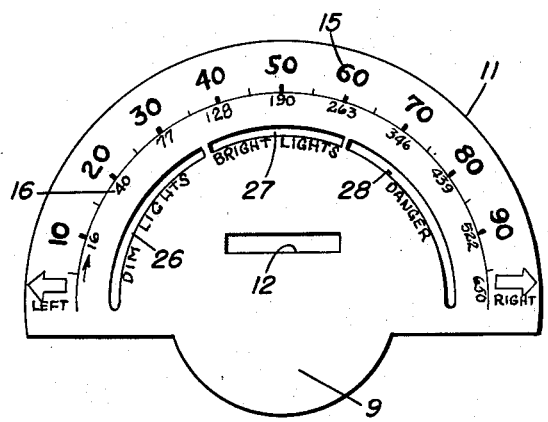

United States Patent Office 2,702,518
Patented Feb. 22, 1955

2,702,518

WARNING ATTACHMENT FOR SPEEDOMETERS

Virgil P. Swartzlander, Gibsonburg, Ohio

Application March 17, 1953, Serial No. 342,881

2 Claims. (Cl. 116—57)

The present invention relates to new and useful improvements in speedometers and more particularly to a warning attachment therefor to indicate to the driver the reasonably safe and dangerous driving speeds at night.

An important object of the invention is to provide an attachment which may be mounted in position on a conventional type of speedometer for accomplishing the aforesaid purpose and wherein the hand or indicator of the speedometer is used to indicate the speed of the vehicle as well as the safe and dangerous speed ranges.

Another object is to provide a dial plate for the speedometer of improved construction and to further provide illuminating means behind the dial plate for the several ranges of speed.

A still further object is to provide a device of this character of simple and practical construction, which is efficient and reliable in operation, relatively inexpensive to manufacture and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged side elevational view with parts shown in section; and

Figure 4 is a front elevational view of the dial plate.

Figures 1, 2:
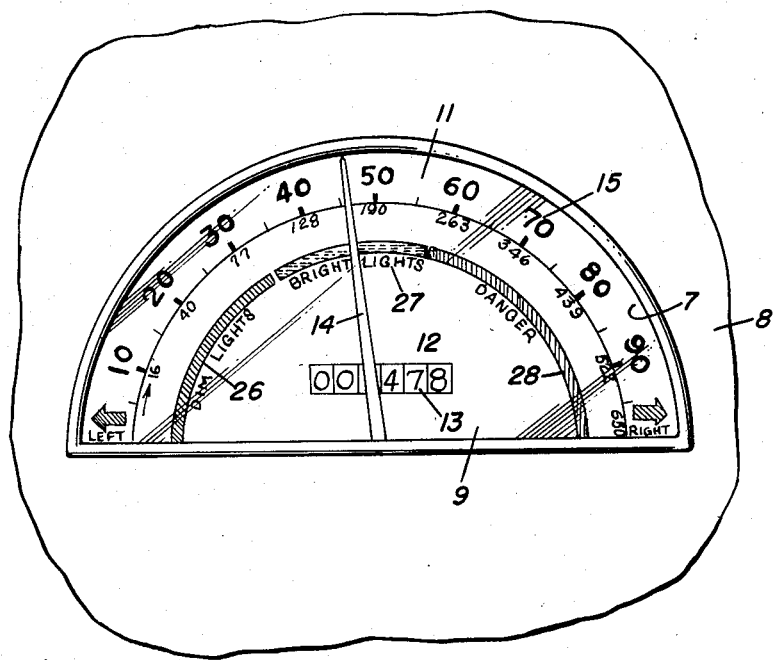
Figure 1 is a front elevational view.
Figure 2 is a front elevational view of the lamp housing for illuminating the dial.

Referring now to the drawings in detail, wherein for the purpose of illustration I have discolsed a preferred embodiment of my invention, the numeral 5 designates a speedometer of a conventional type and which is mounted by a bracket 6 behind a window 7 in the instrument panel 8 of a motor vehicle. A dial plate 9 is attached to the front of the speedometer by brackets 10 and forms the front cover for the speedometer housing. The dial plate is formed with a semi-circular extension 11 which projects beyond the sides and top of the speedometer housing and the plate is formed with a window opening 12 which registers with the mileage indicator 13 of the speedometer. The speedometer, hand or indicator 14 is swingable in front of the dial plate 9 in association with the speed indicating dial or scale 15 displayed on the front surface of the dial plate.

Adjacent the speed indicating dial or scale 15 is a scale 16 which indicates the distance in feet required to stop the vehicle at the various speeds and under normal road conditions.

A lamp housing 17 of arcuate shape is mounted on top of the speedometer housing by attaching brackets 18 and the housing 17 is provided with a plurality of partitions 19 separating the housing into individual compartments 20, 21 and 22. Housing 17 tapers toward its front end where the several compartments are closed with differently colored arcuate lenses 23, 24 and 25 registering with individual arcuate slots 26, 27 and 28 in the extension 11 of dial plate 9. Preferably, lens 23 is green, lens 24 is yellow and lens 25 is red.

Slot 26 is formed adjacent the lower speed range of dial or scale 16, while intermediate slot 27 is formed adjacent the intermediate speed range of dial or scale 16 and slot 28 is formed adjacent the high speed range of the dial or scale 16.

The legend "Dim lights" is displayed adjacent slot 26 to indicate the speed range normally considered safe for driving at night with dim lights and the legend "Bright lights" is displayed adjacent slot 27 to indicate the speed range which requires use of bright lights for safe driving, while the legend "Danger" is displayed adjacent slot 28 to indicate the speed range considered unsafe.

A lamp 29 is mounted in each compartment of the lamp housing by means of spring fingers 30 carried by the lamp socket 31 and snapped in an opening 32 at the rear of the compartment.

The area of the slots 26, 27 and 28 associated with the lower, intermediate and high driving speed ranges respectively is determined by the recommendations of traffic engineers after having established the ranges of safe speed which may be driven when using dim lights or bright lights and beyond which ranges driving becomes dangerous.

The lamps 29 are controlled by the usual light switch of the vehicle to turn on and off with the headlights and the lamp 29 associated with the "Bright light" legend may also be connected with the usual dimmer switch of the vehicle to indicate when the bright lights are on or off.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is:

1. In a warning attachment for speedometers of a type having a swingable hand at the front of a cylindrical casing, an arcuate lamp housing mounted on top of the casing and having a plurality of compartments each provided with an arcuate colored lens at the front of the housing and a lamp behind each lens, a dial plate mounted between the front of the casing and the hand and having a speed indicating scale and also having a plurality of arcuate slots in the plate adjacent the scale and in alignment with the respective arcuate lenses and each slot defining a predetermined range of speed represented by the scale, and said hand being movable over the scale as well as movable over said slots.

2. In a warning attachment for speedometers comprising the combination of a cylindrical speedometer housing having a front cover plate and a swingable hand in front of the plate, said cover plate including a semi-circular extension projecting above and at the sides of the housing, a speed indicating scale on the front face of the extension, a plurality of arcuate slots in the extension adjacent to and each representing a predetermined range of speed as indicated by the scale, an arcuate lamp housing mounted on top of the speedometer housing behind the slots, and contrastingly colored lenses in the front of the lamp housing behind the respective slots and illuminated by lamps in the lamp housing.

References Cited in the file of this patent

UNITED STATES PATENTS

| 1,239,672 | Dahl | Sept. 11, 1917 |
| 1,272,396 | Dixon et al. | July 16, 1918 |
| 1,555,309 | Mott | Sept. 29, 1925 |
| 2,175,129 | Rolfson | Oct. 3, 1939 |